United States Patent
Winkler (10) Patent No.: US 9,343,770 B2
(45) Date of Patent: May 17, 2016

(54) MICROBIAL FUEL CELL, AND RELATED SYSTEMS AND METHODS

(71) Applicant: Livolt, LLC, New York, NY (US)

(72) Inventor: Nathan Winkler, New York, NY (US)

(73) Assignee: Livolt, LLC, New York, NY (US)

( * ) Notice: Subject to any disclaimer, the term of this patent is extended or adjusted under 35 U.S.C. 154(b) by 375 days.

(21) Appl. No.: 13/950,987

(22) Filed: Jul. 25, 2013

(65) Prior Publication Data

US 2014/0030555 A1 Jan. 30, 2014

Related U.S. Application Data

(60) Provisional application No. 61/676,754, filed on Jul. 27, 2012.

(51) Int. Cl.
*H01M 8/16* (2006.01)

(52) U.S. Cl.
CPC ............... *H01M 8/16* (2013.01); *Y02E 60/527* (2013.01)

(58) Field of Classification Search
None
See application file for complete search history.

(56) References Cited

U.S. PATENT DOCUMENTS

| | | | |
|---|---|---|---|
| 4,652,501 A | 3/1987 | Bennetto et al. | |
| 5,976,719 A | 11/1999 | Kim et al. | |
| 7,544,429 B2 | 6/2009 | Kim et al. | |
| 7,767,323 B1 | 8/2010 | Cardenas-Valencia et al. | |
| 7,807,303 B2 | 10/2010 | Swift et al. | |
| 7,927,749 B2 | 4/2011 | Swift et al. | |
| 8,012,632 B2 | 9/2011 | Crookes, Sr. et al. | |
| 2006/0011491 A1* | 1/2006 | Logan | C02F 3/005 205/637 |
| 2006/0147763 A1 | 7/2006 | Angenent et al. | |
| 2007/0248845 A1* | 10/2007 | Armstrong | H01M 4/90 429/2 |
| 2009/0305085 A1* | 12/2009 | Crookes | H01M 8/16 429/2 |
| 2010/0304226 A1* | 12/2010 | Keller | H01M 8/16 429/401 |

FOREIGN PATENT DOCUMENTS

JP 2006081963 * 3/2006

* cited by examiner

*Primary Examiner* — Ula C Ruddock
*Assistant Examiner* — Matthew Van Oudenaren
(74) *Attorney, Agent, or Firm* — Berenato & White, LLC (57) ABSTRACT

A microbial fuel cell is provided that includes a cell housing, a membrane dividing an internal chamber of the cell housing into an anode compartment and a cathode compartment, an anode including a graphite and first microorganisms contained in the anode compartment, a cathode including graphite and a second microorganisms contained in the cathode compartment, and a watercourse communicating the anode compartment and the cathode compartment with one another. A system including at least one microbial fuel cell and methods of operating the microbial fuel cell and system are also provided.

20 Claims, 4 Drawing Sheets

MICROBIAL FUEL CELL, AND RELATED SYSTEMS AND METHODS

CROSS-REFERENCE TO RELATED APPLICATION(S) AND CLAIM(S) OF PRIORITY

This application claims the benefit of priority of U.S. Provisional Application No. 61/676,754 filed in the U.S. Patent & Trademark Office on Jul. 27, 2012, the complete disclosure of which is incorporated herein by reference.

FIELD OF THE INVENTION

This invention relates to microbial fuel cells, especially but not necessarily limited to microbial fuel cells configured to convert biomass-containing wastewater into electricity. This invention also relates to, among other things, other microbial fuel cells, systems containing one or more microbial fuel cells, apparatus and kits for making and installing the microbial fuel cells, methods of making and installing the microbial fuel cells, and methods of generating electricity and treating wastewater with the microbial fuel cells.

BACKGROUND

Electricity is a staple of life. Nearly sixty percent (60%) of the United States' energy supply comes from oil and coal, both of which have finite availability, are harmful to the environment (e.g., global warming), and experience wide price fluctuations. Nuclear energy, which accounts for roughly 9% of the U.S. energy supply, has been viewed with scrutiny since the Three Mile Island meltdown in 1979 and the Chernobyl disaster in 1986, and safety concerns have again been raised in view of the 2011 nuclear reactor meltdowns in Japan.

There is an ever-growing need for energy, and renewable energy sources are increasingly being considered as a possible solution. In a May 2011 report, the Intergovernmental Panel on Climate Change set a global goal pursuant to which seventy-seven percent (77%) of the world's energy will be supplied from renewable sources by 2050. At the time of the report, only approximately thirteen percent (13%) of existing global energy sources used for generating electricity were renewable. In order to dramatically increase the world's use of renewable sources of electricity, multiple renewable energy sources will need to be tapped. Wind and solar energy are the most prominent renewable sources currently being used and developed, but neither will be sufficient to meet the seventy-seven percent (77%) goal on their own or in combination with the other by 2050. The use of wind and solar sources also faces significant potential limitations. Harvesting wind and solar energy to meet electricity consumption demands presents multiple practical challenges, including that each is weather and location dependent, requires relatively expensive and bulky equipment, and often must be located remotely from population centers where the electricity is most needed.

Another potentially valuable renewable energy source for generating electricity is wastewater. Wastewater includes the everyday liquid waste discharged by residential commercial and industrial buildings, including homes and apartment buildings, industrial plans, and agricultural facilities during normal, everyday use. Household wastewater is produced by showers, dish washers, toilets, laundry machines, and other sources. Currently, wastewater is a significantly underutilized potential source of electricity and conventional wastewater treatment methods consume more energy than they produce.

Microbial fuel cells (MFCs) have been considered for electricity generation using wastewater sources. Typically, microbial fuel cells convert chemical energy into electrical energy through a catalytic reaction, in which microorganisms such as bacteria are used as a catalyst in an anode compartment of the fuel cell. Typically, the microorganisms catabolize organic matter (or "biomass") contained in the wastewater under anaerobic conditions to produce carbon dioxide, protons, and electrons. For example, MFCs generate electricity by using an electrode as the electron receptor in the metabolism of a group of bacteria called exoelectrogens. These bacteria consume dissolved organic matter such as glucose:

$$C_6H_{12}O_6 + 6H_2O \rightarrow 6CO_2 + 24H^+ + 24e^- \tag{1}$$

The electrons are then used to reduce Nicotinamide Adenine Dinucleotides (NAD) to NADH, the principal energy-transfer molecule in the cell:

$$e^- + H^+ + NAD^- \rightarrow NADH \tag{2}$$

The resultant NADH molecules in turn transfer the electrons to an electrical circuit, providing current for use in the circuit. More specifically, the electrons absorbed by an anode in this manner are conducted through the circuit and are transferred to a cathode compartment of the fuel cell containing a cathode connected to the electrical circuit. At the cathode electrons provide the energy needed to drive the reaction between protons and oxygen to form water:

$$4e^- + 4H^+ + O_2 \rightarrow 2H_2O \tag{3}$$

The protons at the cathode are supplied by the initial oxidation of the dissolved organic matter and migrate to the cathode via one or more processes. Often, the proton transport is achieved via diffusion of the protons through a cation exchange membrane separating the anode and cathode compartments of the microbial fuel cell. The potential across the circuit is driven by the reaction between the protons and oxygen, usually under aerobic conditions, at the cathode to form water. This reaction optionally may be catalyzed via microbial activity or precious metals at the cathode.

The potential chemical energy or cell voltage available from the reactions inside a microbial fuel cell is thermodynamically fixed based on the concentration of reactants and the temperature of the medium, according to the Nernst equation. The total energy available from the fuel cell is the difference between the cathode and anode voltages:

$$E_{emf} = E_{cathode} + E_{anode} \tag{4}$$

This is essentially the potential for the oxidation of the organic matter, e.g., glucose:

$$E_{Gluc} = E^0 - RT/24F \cdot \ln(([CO_2]^2[H^+]^{24})/([H_2O]^6[C_6H_{12}O_6])) \tag{5}$$

wherein R is the ideal gas constant, T is the temperature of reaction, F is Faraday's constant [C/mole-e$^-$], and E$^0$ is standard potential at pH 1 and 25° C.

The energy from glucose oxidation is used for the reduction of NAD:

$$E_{NAD} = E^0 - RT/2F \cdot \ln([NADH]/([H^+][NAD^-])) \tag{6}$$

NAD oxidation then releases electrons to the circuit, which drive the reaction at the cathode $$E_{O2} = E^0 - RT/4F \cdot \ln([H_2O]^2/([H^+]^4[O_2])) \tag{7}$$

The consumption rate of BOD in the MFC is a function of microbial kinetics, substrate concentration, and reactor architecture. For a plug-flow reactor typically used in wastewater treatment, the residence time of water in the reactor, given a required BOD reduction is a function of all these parameters:

$$\theta = \frac{1}{q}\left\{\left(\frac{K}{X+YS^i}+\frac{1}{Y}\right)\ln(X+YS^i-YS^e)-\left(\frac{K}{X+YS^i}\right)\ln\left[\frac{S^eX}{S^i}\right]-\frac{1}{Y}\ln(X)\right\} \quad (8)$$

wherein Θ is hydraulic residence time [d], K is half saturation coefficient [mg BOD/L], X is mixed liquor suspended solids [mg/L], $S^i$ is influent BOD [mg BOD/L], $S^e$ is effluent BOD [mg BOD/L], Y is max yield [g VSS/g BOD], and q is max substrate utilization [mg/mg VSS-d].

The current generated by the biofilm on the anode is a function of the microbial kinetics, the concentration of bacteria and the energy content of the substrate $$I = (\mu_{max} X^* b_e/Y) \cdot (FC_E) \quad (9)$$

wherein I is current, $\mu_{max}$ is maximum specific growth rate of bacteria, $b_e$ is electrons per mole of substrate, X is active bacteria [mg/L], Y is max yield [g VSS/g BOD], F is Faraday's constant [C/mol-e⁻], and $C_E$ is columbic efficiency, ratio of electrons transferred to anode relative to total liberated.

The impact of temperature on the kinetics varies according to the bacterial culture. Correlations for scaling microbial activity according to temperature may be used with empirical data:

$$k_2 = k_1 e^{\phi(T2-T1)} \quad (10)$$

wherein k is kinetics parameter T and K (defined above), and ϕ is an adjustment factor.

Lab-scale microbial fuel cells operating at optimum conditions have been found to create power densities ranging from 5 to 1,000 Watts per cubic meter (W/m³) of reactor volume. Such power densities, particularly at the lower region of the range, have limited commercial uses.

SUMMARY

According to a first aspect of the invention, a microbial fuel cell is provided featuring a cell housing, a membrane dividing an internal chamber of the cell housing into an anode compartment and a cathode compartment, an anode in the anode compartment for substantially anaerobically treating biomass of wastewater entering into the cell housing, a flow-through watercourse configured to permit the flow of wastewater treated at the anode into the cathode compartment, and a cathode in the cathode compartment for substantially aerobically treating the biomass of wastewater received through the watercourse from the anode compartment.

According to a second aspect of the invention, a microbial fuel cell is provided featuring a cell housing, an anode for substantially anaerobically treating biomass of wastewater entering into the cell, and a cathode for substantially aerobically treating the biomass of the wastewater received from the anode compartment, wherein the microbial fuel cell is free of a water-impermeable barrier between the anode and the cathode that divides the cell housing into separate anode and cathode compartments.

A third aspect of the invention provides a system featuring a distribution container, a plurality of microbial fuel cells, and a plurality of feed lines connecting the distribution container to the microbial fuel cells. The microbial fuel cells may include one or more microbial fuel cells of the first aspect of the invention, one or more microbial fuel cells of the second aspect of the invention, or a combination thereof.

According to a fourth aspect of the invention, a method is provided for operating a microbial fuel cell. The method involves use of one or more microbial fuel cells of the first aspect of the invention, one or more microbial fuel cells of the second aspect of the invention, or a combination thereof. A biomass of wastewater received through an inlet of the cell housing is substantially anaerobically treated at the anode. The biomass of wastewater received at the cathode is substantially aerobically treated with an oxidizing agent at the cathode.

A fifth aspect of the invention provides a method for operating a system featuring a distribution container, a plurality of microbial fuel cells, and a plurality of feed lines connecting the distribution container to the microbial fuel cells. The microbial fuel cells may include one or more microbial fuel cells of the first aspect of the invention, one or more microbial fuel cells of the second aspect of the invention, or a combination thereof.

Other aspects of the invention, including apparatus, devices, kits, systems, methods and processes, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARLY EMBODIMENTS AND METHODS

Reference will now be made in detail to the exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the exemplary embodiments and methods.

Figure 1:
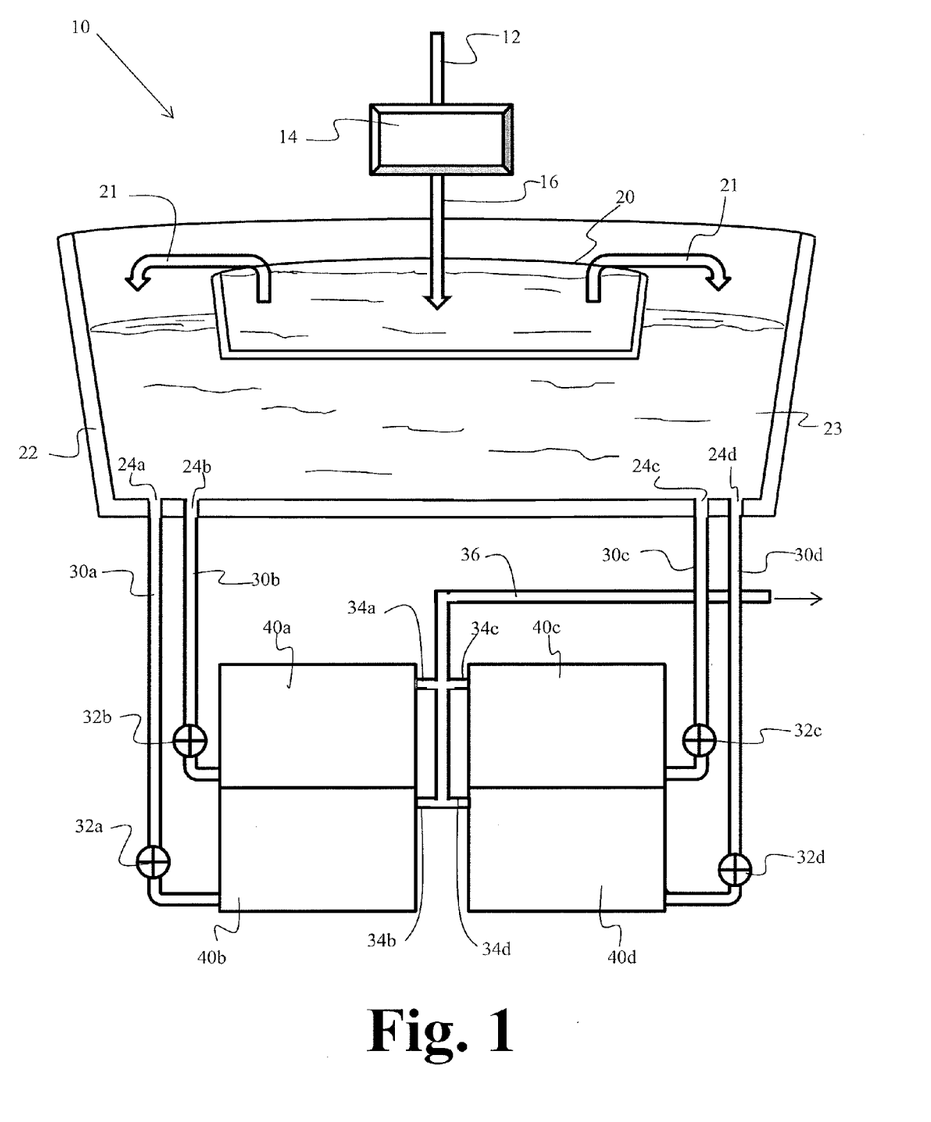
FIG. 1 is a schematic of a system containing multiple microbial fuel cells according to an exemplary embodiment of the invention.

Referring now more particularly to a system generally designated by reference numeral 10 in FIG. 1, wastewater influent containing biomasses, i.e., organic matter such as food, oil, excrement, and/or compost, is fed into the system 10 through a main waste line 12. In order to improve the microbial degradation of the organic matter, such that greater direct current is produced by the system 10 as described below, a solid/liquid separator 14 is provided for reducing the risk that larger solid debris might clog the system 10 downstream.

Alternatively, the solid/liquid separator 14 may be replaced or supplemented with a screen or other device for preventing the passage of larger, potentially system-clogging debris downstream.

Transfer line 16 delivers the wastewater influent with its biomass into a collection container or basin 20. In the illustrated embodiment, the container 20 is open at its top and suspended within a larger distribution container or tank 22, for example, using conventional fasteners, such as bolts, as explained below with respect to suspension of anode and cathode components. The dimensions of the collection container 20 and distribution container 22 are scaled according to the anticipated flow rate of incoming water, the number of microbial fuel cells in the system 10, the capacity of the microbial fuel cells, and the desired electrical output of the system 10. The influent wastewater accumulates in the collection container 20 until its level exceeds the upper edge of the collection container 20, at which point the wastewater with its biomass spills over the edges of collection container 20 (as indicated by the arrows 21 on the opposite side of the basin 20 in FIG. 1) into the distribution container or tank 22 containing a reservoir 23 of the wastewater. To the extent that particulates may have by-passed or escaped the solid/liquid separator 14, particulate removal may be handled with a standard solid/liquid separator such as a downspout diverter commonly used in rainfall collection systems.

The bottom of the distribution container 22 includes four outlet ports 24a, 24b, 24c, and 24d, each of which is in communication with a respective influent (feed) line 30a, 30b, 30c, and 30d for transferring the wastewater from the reservoir 23 to microbial fuel cells 40a, 40b, 40c, and 40d, respectively. The flow of wastewater through the influent lines 30a, 30b, 30c, and 30d and into their respective microbial fuel cells 40a, 40b, 40c, and 40d may be controlled by check valves 32a, 32b, 32c, and 32d, respectively, which prevent back washing and clogging. The microbial fuel cells 40a, 40b, 40c, and 40d are associated with effluent lines 34a, 34b, 34c, and 34d, respectively, which connect to a main effluent line 36. Gravity may be relied upon to force the water out of the microbial fuel cells 40a, 40b, 40c, 40d and into the main effluent line 36. The main effluent line pipe 36 may be unchecked by a valve to allow for venting gases produced in the reactor, as well as the flow of an oxidizing agent such as oxygen into the microbial fuel cells 40a, 40b, 40c, and 40d for promoting aerobic reactions in the cathode compartment, as discussed below. The main effluent line 36 may feed to the sewer, a post-treatment process, a septic tank, a recycle line, etc.

The system 10 of FIG. 1 shows the distribution container 22 in operative connection with four microbial fuel cells 40a, 40b, 40c, and 40d. The microbial fuel cells 40a, 40b, 40c, and 40d are substantially identical structurally in this embodiment. In view of these similarities, and in the interests of simplicity and brevity, the following discussion will sometimes use reference numerals without a letter suffix to designate substantially identical parts. For example, the reference numeral 40 will be sometimes used when generically referring to any of the microbial fuel cells 40a, 40b, 40c, and 40d rather than reciting each reference numeral with its suffix. It will be appreciated that the description of the microbial fuel cell 40 below is applicable to each of the microbial fuel cells 40a, 40b, 40c, and 40d. It will also be appreciated that one or more of the microbial fuel cells 40a, 40b, 40c, and 40d in the system 10 need not necessarily be substantially identical to the others. While four microbial fuel cells 40a, 40b, 40c, and 40d are shown in FIG. 1, it should be understood that the system 10 may include, one, two, three, or more microbial fuel cells in various arrangements, stacks of two, three, four, or more microbial fuel cells 40a arranged in one, two, three, or more stacks, or unstacked or otherwise arranged.

The architecture of the system 10 shown in FIG. 1 serves as an improvement over existing art because it allows each of the microbial fuel cells 40a, 40b, 40c, and 40d to receive equal flows of influent wastewater from the reservoir 23. Further, the architecture allows the system 10 to be used with intermittent or continuous incoming wastewater flow while preventing ebbs and surges of incoming wastewater from creating turbulence in the fuel cells.

Figure 2:
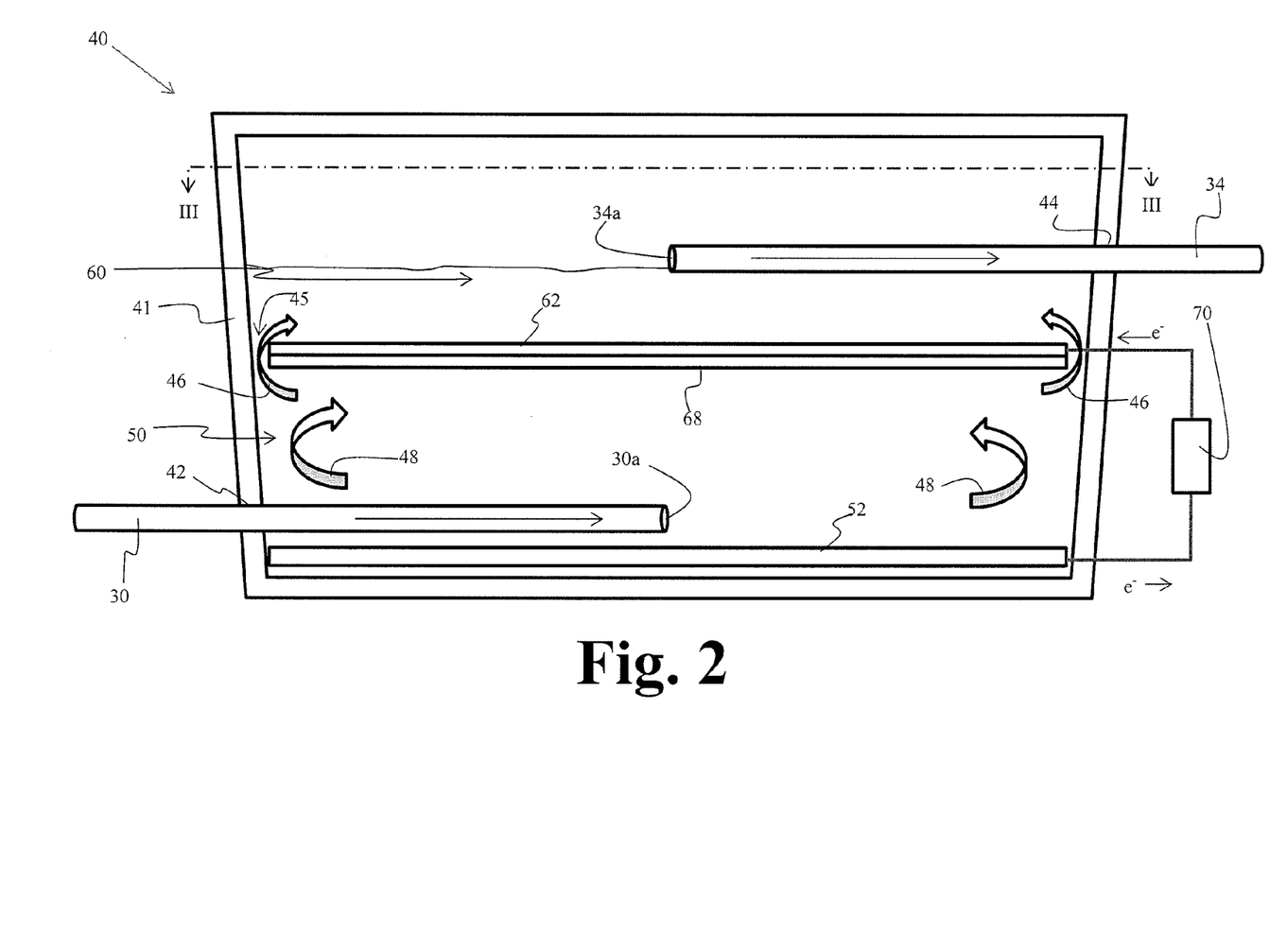
FIG. 2 is a cross-sectional view of a microbial fuel cell suitable for the system of FIG. 1.

As shown in FIG. 2, the microbial fuel cell 40 includes a cell housing 41 which is illustrated having a box-like, rectangular prism configuration, although it will be appreciated that other configurations may be selected for the microbial fuel cell 40 depending upon application, space availability and optimization, and aesthetic considerations. The cell housing 41 may be made from a substantially non-conductive material, for example, high-density polyethylene. The cell housing 41 has an inlet 42 through which influent line 30 passes for introducing wastewater into the cell housing 41. The cell housing 41 also includes an outlet 44 through which effluent line 34 extends for discharging wastewater from the cell housing 41 of the microbial fuel cell 40. The inlet 42 and the influent line 30 extending through the inlet 42 are positioned at a lower elevation than the outlet 44 and the effluent line 34. In an exemplary operation, this arrangement allows the microbial fuel cell 40 to be substantially completely filled (up to the level of its effluent line 34) with wastewater at all times, and to release the wastewater through the effluent line 34 only upon the addition of new wastewater, i.e., such that the wastewater level rises to reach the opening 34a of the effluent line 34. The influent line 30 and effluent line 34 may be pipes, and the lines 30, 34 may be made of, for example, polyvinylchloride (PVC).

The microbial fuel cell 40 defines a chamber (unnumbered) that is divided into an anode compartment 50 and a cathode compartment 60 by a membrane 68 (discussed below). The anode compartment 50 is in communication with the inlet 42 and the influent line 30 to receive wastewater into the microbial fuel cell 40. The cathode compartment 60 is in communication with the outlet 44 and the effluent line 34 for discharging wastewater from the microbial fuel cell 40. In the illustrated embodiment, the influent line 30 and the effluent line 34 having their respective discharge/intake openings 30a and 34a located substantially at the center of the anode compartment 50 and the cathode compartment 60, respectively. The anode compartment 50 is located at a lower elevation than the cathode compartment 60. In the interest of compactness, in the illustrated embodiment the anode compartment 50 is positioned directly below the cathode compartment 60.

The anode compartment 50 includes at least one anode 52 made at least in part of a highly conductive and non-corrosive material. Various materials may be used as the anode 52, such as stainless steel, gold, silver, platinum, graphite, and/or carbon cloth. For example, in the illustrated exemplary embodiment the anode 52 may be configured as an assembly including a conductive high surface area structure, such as a stainless steel mesh or cloth, suspended above the bottom wall of the cell housing 41. It should be understood that the anode 52 may undertake different configurations, including elongated members such as bars, rods, and plates, and fibrous structures. Desirably, the anode 52 is structured to provide a high surface area to volume ratio.

In a currently envisioned exemplary embodiment, the conductive high surface area anode 52 structure, e.g., the stainless steel mesh or cloth, is impregnated, covered, or otherwise treated with graphite powder for improving bioaccumulation on and conductivity of the anode 52. The graphite powder may be present in the form of a packed bed to provide a microbial habitat, and may be soaked in a current-producing microorganism (e.g., bacteria) rich solution from an existing microbial fuel cell to enrich the microorganism content on the anode 52 and provide a biofilm. For example, in one exemplary embodiment, the anode 52 has multiple, substantially aligned fibers with a biofilm. In the absence of an existing microbial fuel cell as a bacteria source, the microorganism (e.g., bacteria) may be collected from, for example, anoxic marsh sediment. The microorganisms oxidize organic matter, specifically the biomass of the incoming wastewater, to generate electrons which are transferred to an electrical circuit and protons that are transferred to a cathode 62, as discussed below. Microorganisms may include, for example, *Escherichia coli, Geobacter sulfurrenducens, Pseudomonas aeruginos, Desulfovibrio desulfuricans, Thiobacillus denitrificans, Micrococcus denitrificans*, and *Paracoccus denitrificans*.

The anode 52 and the cathode 62 discussed below provide certain advantages in exemplary embodiments illustrated in the accompanying drawings, including high electrode surface area for elevated (or maximum) microbial colonization and thus current production (primarily due to the graphite powder), high electrical conductivity for increased energy harvesting, non-toxicity, a durable structure in which gravity settles the graphite back into place if the microbial fuel cell 40 is physically disturbed, and relatively inexpensive costs.

The cathode compartment 60 includes at least one cathode 62 made of a highly conductive material, which may be the same as or different than the conductive material selected for the anode 52. Like the anode 52, the cathode 62 may be coated or otherwise associated with graphite powder to provide a microbial habitat. The cathode 62 also may be structured as bars, rods, plates, mesh, cloth, etc. The cathode 62 and the anode 52 may possess different structures from one another. The cathode 62 may dispense with the use of a metal catalyst such as platinum and instead opt for use of a biocatalyst. For example, the cathode 62 may be colonized by microorganisms such as bacteria identical to or different than those colonizing the anode 52. However, while the cathode 62 is operated substantially or completely aerobically, the anode 52 is operated substantially or completely anaerobically. "Substantially aerobic" and "substantially anaerobically" are quantified as at least about 95 wt %, preferably at least about 99 wt %. The system is designed such that oxygen is abundant at the cathode and thus virtually all reactions at the cathode are aerobic. The anode is designed to be substantially or completely deprived of oxygen, and thus virtually all reactions at that location are anaerobic.

The optimum cathode 62 position is the deepest depth at which the cathode 62 may be positioned below the wastewater surface while still receiving sufficient oxygen (or other oxidizer) concentration to sustain the substantially or completely aerobic reaction at the cathode 62. By positioning the cathode 62 at or in substantial proximity to its optimum depth, the size of the cathode 62 can be increased and optimized while maintaining the bacteria or other microorganisms of the cathode 62 immersed in the wastewater.

The anode 52 may be suspended in the cell housing 41 and spaced from the opening 34a of the effluent line 34 by a distance selected to optimize oxygen diffusion to the anode 52 through the wastewater, theoretically completely consuming the oxygen, assuming typical activated sludge kinetics governed by the Monod equation in the cathode compartment 60. The distance (d) that the anode 52 is spaced from the opening 34a of the effluent line 34 may be determined by the following relationship, which is based on Fick's Law of Diffusion:

$$d = Dw * [C_{Oxygen}/u],$$

wherein d is the distance between the anode and cathode, Dw is the rate of diffusion of water, $C_{Oxygen}$ is the dissolved oxygen concentration at the surface of the water, and u is the rate of oxygen consumption in the water column due to microbial growth.

The concentration of oxygen at the surface of the water column or ($C_{Oxygen}$) is defined by Henry's Law:

$$C_{Oxygen} = H * P_{Oxygen}$$

wherein $P_{Oxygen}$ is the partial pressure of oxygen in the air above of the water, and H is Henry's Constant relating the dissolved surface concentration and the partial pressure in the air for a given temperature.

The rate of microbial oxygen consumption in the water column (u) is proportional to the rate of microbial growth, as defined in the Monod equation:

$$dO/dt = u = umax * (S/[Ks + S]),$$

wherein dO/dt is the rate of oxygen consumption, u is the rate of microbial growth, umax is the max rate of microbial growth, S is the limiting substrate for microbial growth (in this case, oxygen), and Ks is the half velocity constant, where u/umax=0.5.

Although the above embodiment describes supplying oxygen, such as present in ambient air, for the aerobic reaction, it should be understood that another oxidizing agent may be supplied, such as, for example, ozone, a nitrate, a nitrite, nitrous oxide, sulfate, sulfite, and carbon dioxide. The oxidizer may be introduced through the effluent line 34 or through another port (not shown) associated with the cathode chamber 60 of the cell housing 41.

As an alternative to providing bacteria to catalyze the aerobic reaction at the cathode, a metal such as platinum or cobalt may serve as the cathode 62 or be impregnated in the cathode as a catalyst, in which case the presence microorganisms such as bacteria in the cathode compartment 60 is optional.

In FIG. 2, a membrane 68 separates the anode compartment 50 from the cathode compartment 60. The membrane 68 may include or be constituted by a barrier substantially impermeable to liquid water for preventing the bulk of the liquid-phase wastewater from flowing directly from the anode compartment 50 to the bottom of the cathode 62. In an exemplary embodiment, the membrane 68 is a cation exchange membrane that permits the diffusion of protons freely (or relatively freely) there through. The membrane 68 is illustrated in direct contact with and coextensive with the bottom of the cathode 62. In a currently envisioned exemplary embodiment, the membrane 68 is secured to, for example sewn to, the bottom of the cathode 62, and is at least coextensive with, if not larger in surface area than, the bottom of the cathode 62. The membrane 68 thereby provides a structural support (or floor) for supporting the graphite powder of the cathode 62. The membrane 68 as shown also separates the two reaction regimes (i.e., the anode and cathode compartments 50, 60) from one another while allowing diffusion of protons from the anode compartment 50 to the cathode 62.

The membrane 68 may be a cation exchange membrane. Representative exemplary membranes 68 are Ultrex® and Tyvek®. Other examples of cationic exchange members that have been used in the art and may be appropriate for embodiments described herein include Nafion 117 (DuPont) and CMI-7000 (Membranes International Inc.). Still other membrane materials, such as fabrics and permeable polyamides may be used. As discussed above, active transport of protons generated at the anode 52 to the cathode 62 can be accomplished by diffusion through the cation exchange membrane 68, thus ensuring the cathode reaction is not limited by protons.

Alternatively or in addition thereto, the protons may be transported from the anode compartment 50, through a gap or opening, also referred to herein as a watercourse 45 (described in greater detail below) between the edges of the cathode 62 and membrane 68, and into the cathode compartment 60, as shown by arrow 46. A portion or the entirety of the peripheries of the cathode 62 and the membrane 68 may be spaced from the side walls of the cell housing 41 to create the watercourse or opening 45 that serves as a flow path for permitting wastewater to travel upward from the anode compartment 50 to the cathode compartment 60. The narrowness of the opening 45 and the contact of the membrane 68 with the bottom of the cathode 62 combine to create a substantially semi-circular flow pattern 48 (FIG. 2) of wastewater in the anode compartment 60. The semi-circular flow pattern 48 encourages sedimentation and concentrates the bulk of the organic matter in the influent on the anode 52 where it is intended to collect. Depending on whether the watercourse 45 is provided and the type of membrane (e.g., cation exchange or not) provided, protons may travel to the cathode 62 via diffusion through the membrane 68 alone, via active transport through the watercourse 45 alone, and/or via both diffusion through the membrane 68 and active transport through the water course 45.

Figure 4:
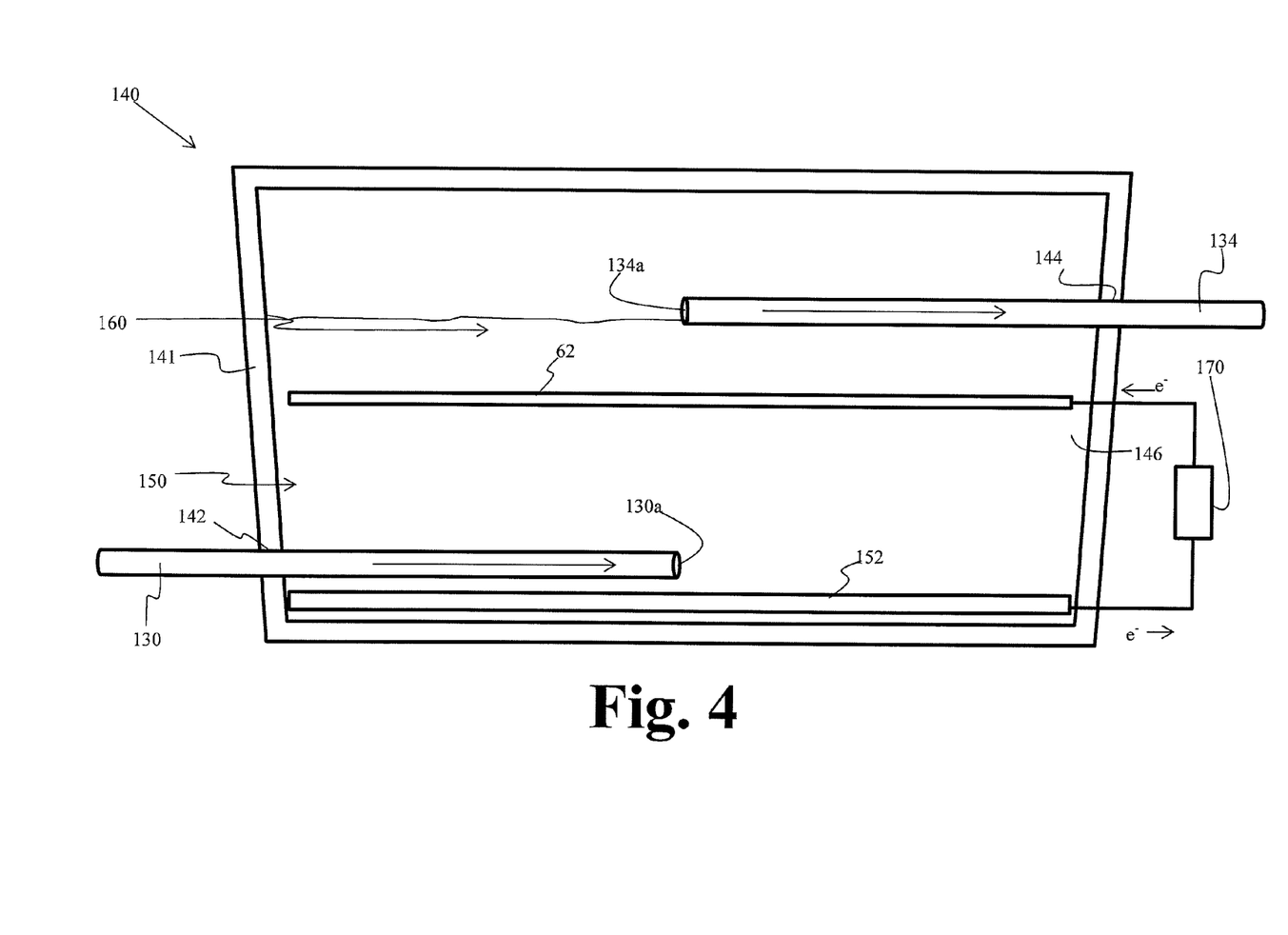
FIG. 4 is a cross-sectional view of a microbial fuel cell according to another embodiment of the invention.

Embodiments of the present invention can also eliminate the need for costly measures such as cation exchange membranes 68. For example, in the embodiment shown in FIG. 4, the microbial fuel cell 140 is membraneless, or without a membrane between the anode 152 and the cathode 162, such that the chamber is not physically divided into separate anode and cathode compartments. In the interest of brevity, the same reference numerals are used for FIGS. 2 and 4, except that the reference numerals in FIG. 4 are in the hundreds. For example, the anode 52 of FIG. 2 corresponds to the anode 152 of FIG. 4.

In FIG. 4, the membrane 68 (FIG. 2) is eliminated, and likewise the watercourse 45 (FIG. 2) may be eliminated. Protons travel directly from the anode 152 to the cathode 162 with movement of the wastewater and/or diffusion. The distance between the cathode 162 and the anode 152 may be arranged to be sufficiently great to ensure that all of the oxygen is consumed prior to it diffusing to the anode 152. The elimination of the membrane 68 (FIG. 2) provides advantages in terms of cost, durability, and maintenance. The embodiment of FIG. 4 is particularly useful in operational regimes where the active transport of protons to the cathode is sufficient high that diffusion of protons through a membrane is not required.

Referring back to FIG. 2 (although also pertinent to the embodiment of FIG. 4), the discharge opening 30a of the influent line 30 is positioned in proximity to the center of the anode compartment 50, and hence spaced away from the opening 45. Advantageously, as the wastewater follows its semi-circular flow pattern, it flows around the peripheral edges of the cathode 62 and the membrane 68 and through the opening 45. Solid particles that might clog other conventional systems settle to the bottom of the anode compartment 50 or float up against the bottom of the membrane 68 (in FIG. 2), where the particles are retained by friction. Mostly only free flowing liquid passes through the opening 45 (in FIG. 2), into the cathode compartment 60, and out of the cell housing 41 through the effluent line 34. To the extent that any solid particles reach the opening 45, shearing force of the water passing through the opening 45, combined with gravity, prevents the particles from clogging the opening 45.

Figure 3:
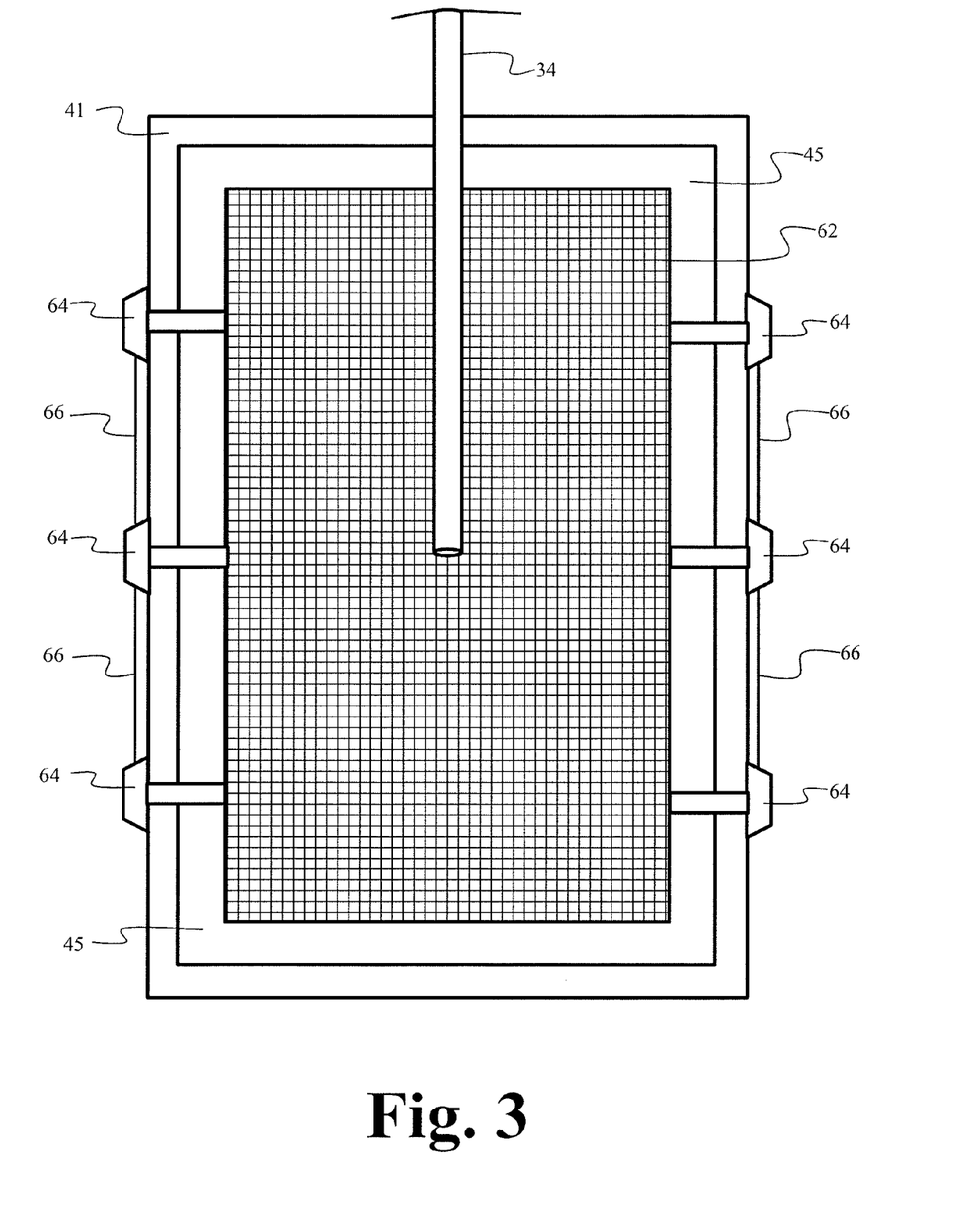
FIG. 3 is a cross-sectional view of the microbial fuel cell of FIG. 2 taken along sectional line of FIG. 2.

As shown in FIG. 3, to create the spacing for the opening 45 between, on the one hand, the peripheries of the cathode 62 (shown as a mesh) and membrane 68 (FIG. 2) and, on the other hand, the inner surface of the side wall of the cell housing 41, conductive fasteners 64 (not shown in FIG. 2 for simplicity purposes), such as stainless steel bolts, may be used to connect and suspend the cathode 62 and membrane 68 from the cell housing 41 of the microbial fuel cell 40. The use of conductive materials as the fasteners 64 can be especially advantageous inasmuch as the conductive fasteners 64 may extend outside (or be electrically connected to a conductor outside) the cell housing 41 to provide an electrical connection between the cathode 62 and an electrical circuit 70, 170 (FIGS. 2, 4). As shown in FIG. 3, electrical wires 66 electrically connect the conductive fasteners 64 to one another. It should be understood that the anode 52 may be suspended in the cell housing 41 and connected to the electrical circuit 70 in a similar manner.

Returning to FIG. 2 (although also applicable to FIG. 4), the inlet 42 may be a port or aperture associated with the influent (incoming feed) line 30, e.g., a pipe. The feed line 30 may extend into the center of the anode compartment 50 of the cell housing 41, to discharge incoming wastewater, for example, directly above the anode 52. As wastewater continues to be fed into the anode compartment 50 via the feed line 30, the wastewater accumulated in the anode compartment 50 is forced upward through the opening 45 into the cathode compartment 60. As best shown in FIG. 2, the outlet 44 also may be a port or aperture associated with the effluent (discharge) line 34, e.g., another pipe. The discharge line 34 may extend into the center of the anode compartment 60 of the cell housing 41 above the center of the cathode 62. The accumulating wastewater, which has entered the cathode compartment 60 through the opening 45, is forced out through the opening 34a of the effluent line 34 by the rise in water level. Beneficially, positioning the respective openings 30a and 34a of the influent line 30 and the effluent line 34 proximate to the center of their respective compartments 50 and 60 increases the likelihood that the wastewater will flow across the entirety of the anode 52 and the cathode 62 prior to exiting the cell housing 41 through the effluent line 34. It should be understood that the discharge line 34 may be connected to a recycle line (e.g., branching from the main line 36 in FIG. 1) for recycling a portion or all of the treated wastewater back into the anode chamber 40 through the influent line 30 or another incoming feed. Further, although no pumps are contained in the cell housing 41 in the illustrated embodiment, it is possible to add pumps to the system 10 at various locations, particularly in association with the feed line 30.

In the context of the system 10 of FIG. 1 or other systems, the electrical circuit 70 may be connected to one, two, three, or more, including all, of the microbial fuel cells 40a, 40b, 40c, 40d, etc., of the system 10. Wiring may be in parallel in order to combine the individual current outputs of the microbial fuel cells 40a, 40b, 40c, and 40d. Parallel wiring will cause the entire stack to produce power at the average voltage of all the microbial fuel cells. As mentioned above, the system 10 is flexible as to the number of microbial fuel cells 40 it may include. The number of microbial fuel cells 40 may be determined based on power demands and/or space availability.

Although not shown, the microbial fuel cell may be operated with a heater or heat exchanger to maintain the chamber of the microbial fuel cell at a desired temperature, such as on the order of 15° C. to 35° C. For example, a thermosiphon hot water tank with a solar thermal thermosiphon heater may be provided, and hot glycol may be cycled from the heater to the microbial fuel cell for heating the wastewater.

Embodiments disclosed herein are envisioned to provide low maintenance apparatus and devices that may be installed in residential homes, apartment and condominium buildings, truck stops, industrial plants, office buildings, and citywide wastewater treatment plants, to mention just a few of the potential uses. The microbial fuel cells may be incorporated into staple building appliances and systems, such as boilers and septic systems. The design allows installation and servicing without specialized training, such that capable plumbers and electricians will be able to install and maintain the microbial fuel cells. The relative compactness also makes the microbial fuel cells suitable for online sales and sales through brick-and-mortar stores such as hardware and home improvement stores. In addition to allowing for versatile installation, the structure eliminates the need for costly measures such as cation exchange membranes, active cathode aeration, and pumps.

In addition to electricity generation, another potential advantage of systems, apparatus, devices and methods disclosed herein is the removal of biological oxygen demand (BOD removal) from wastewater. For example, the New York City Department of Environmental Protection (NYCDEP) currently imposes a sewer charge for wastewater treatment. Exemplary embodiments disclosed herein are envisioned to accomplish at least a portion, for example about 50%, of the work of large wastewater treatment plants that are paid for via the sewer charge. MFCs and systems described herein may be piped directly into the sewer line of a residence, such as a single family home, with the electrical output used to power, for example, low-voltage LED lawn lights, cellphone charges, and other electrical and electricity driven devices.

The foregoing detailed description of the certain exemplary embodiments of the invention has been provided for the purpose of explaining the principles of the invention and its practical application, thereby enabling others skilled in the art to understand the invention for various embodiments and with various modifications as are suited to the particular use contemplated. For example, the microbial fuel cell 50 illustrated in the accompanying drawings is a semi-batch or continuous fuel cell. However, batch fuel cell embodiments are envisioned and can be implemented by those skilled in the art having reference to this disclosure.

In embodiments described above, the system 10 and microbial fuel cells 40 advantageously may be operated mediatorless, that is, without an artificial electron transfer mediator (e.g., thionine, methylene blue, brilliant cresyl blue, benzyl viologen, hydroxynaphatoquinone, etc.) or a mediator equivalent such as sulfate.

This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A microbial fuel cell comprising:
   a cell housing having an internal chamber, an inlet, and an outlet;
   a membrane substantially impermeable to liquid water located in the cell housing and dividing the internal chamber of the cell housing into an anode compartment and a cathode compartment, the anode compartment configured to receive wastewater containing a biomass from the inlet, the cathode compartment positioned at a higher elevation than the anode compartment and configured to communicate with an oxidizing agent and to discharge the wastewater through the outlet;
   an anode comprising first microorganisms, the anode located in the anode compartment for substantially anaerobically treating the biomass of the wastewater entering into the cell housing through the inlet;
   a flow-through watercourse configured to permit the flow of wastewater treated at the anode into the cathode compartment; and
   a cathode comprising second microorganisms contained in the cathode compartment for substantially aerobically treating the biomass of wastewater received through the watercourse with the oxidizing agent.

2. The microbial fuel cell of claim 1, wherein the membrane comprises a cation exchange membrane.

3. The microbial fuel cell of claim 1, wherein the flow-through watercourse comprises a gap established between, on the one hand, the cell housing and, on the other hand, peripheral edges of the membrane and the cathode.

4. The microbial fuel cell of claim 3, wherein the gap extends substantially entirely around the peripheral edge of the membrane and the cathode.

5. The microbial fuel cell of claim 1, wherein the cathode compartment is positioned directly above the anode compartment, and the cathode is positioned directly above the anode.

6. A system comprising:
   a distribution container;
   a plurality of microbial fuel cells according to claim 1; and
   a plurality of feed lines connecting the distribution container to the microbial fuel cells.

7. A method comprising:
   providing a microbial fuel cell according to claim 1;
   substantially anaerobically treating a biomass of wastewater received through an inlet of the cell housing at the anode in the anode compartment;
   permitting the wastewater to flow through the watercourse from the anode compartment to the cathode compartment positioned at a higher elevation than the anode compartment; and
   substantially aerobically treating the biomass of wastewater received through the watercourse with an oxidizing agent at the cathode,
   wherein the microbial fuel cell is operable in a semi-batch mode and a continuous mode.

8. A microbial fuel cell comprising:
   a cell housing having an internal chamber, an inlet, and an outlet;
   a membrane substantially impermeable to liquid water located in the cell housing and dividing the internal chamber of the cell housing into an anode compartment and a cathode compartment, the anode compartment configured to receive wastewater containing a biomass from the inlet, the cathode compartment positioned at a higher elevation than the anode compartment and configured to communicate with an oxidizing agent and to discharge the wastewater through the outlet;
   an anode comprising graphite and first microorganisms, the anode located in the anode compartment for substantially anaerobically treating the biomass of the wastewater entering into the cell housing through the inlet;
   a flow-through watercourse configured to permit the flow of wastewater treated at the anode into the cathode compartment; and
   a cathode comprising graphite and a second microorganisms contained in the cathode compartment for substantially aerobically treating the biomass of wastewater received through the watercourse with the oxidizing agent.

9. The microbial fuel cell of claim 8, wherein the flow-through watercourse comprises a gap established between, on the one hand, the cell housing and, on the other hand, peripheral edges of the membrane and the cathode.

10. The microbial fuel cell of claim 9, wherein the gap extends substantially entirely around the peripheral edge of the membrane and the cathode.

11. The microbial fuel cell of claim 8, further comprising an electrical circuit connecting the anode and the cathode.

12. The microbial fuel cell of claim 8, wherein the cathode compartment is positioned directly above the anode compartment, and the cathode is positioned directly above the anode.

13. The microbial fuel cell of claim 8, wherein the anode comprises a stainless steel cloth coated with graphite powder in which the first microorganisms are colonized.

14. The microbial fuel cell of claim 8, wherein the membrane has an upper surface that is at least coextensive with and in direct contact with a lower surface of the cathode.

15. A system comprising:
a distribution container;
a plurality of microbial fuel cells according to claim 8; and
a plurality of feed lines connecting the distribution container to the microbial fuel cells.

16. A method of operating a microbial fuel cell, comprising:
providing a microbial fuel cell according to claim 8;
substantially anaerobically treating a biomass of wastewater received through an inlet of the cell housing at the anode in the anode compartment;
permitting the wastewater to flow through the watercourse from the anode compartment to the cathode compartment positioned at a higher elevation than the anode compartment; and
substantially aerobically treating the biomass of wastewater received through the watercourse with an oxidizing agent at the cathode,
wherein the microbial fuel cell is operable in a semi-batch mode and a continuous mode.

17. The microbial fuel cell of claim 1, further comprising a line or port for introducing and releasing the oxidizing agent into the cathode compartment at an interface of the wastewater and air above the wastewater for passive aeration of the cathode chamber to permit the substantially aerobic treatment of the biomass of the wastewater.

18. The microbial fuel cell of claim 1, wherein the microbial fuel cell does not contain a pump.

19. The microbial fuel cell of claim 8, further comprising a line or port for introducing and releasing the oxidizing agent into the cathode compartment at an interface of the wastewater and air above the wastewater for passive aeration of the cathode chamber to permit the substantially aerobic treatment of the biomass of the wastewater.

20. The microbial fuel cell of claim 8, wherein the microbial fuel cell does not contain a pump.

* * * * *